(No Model.) 6 Sheets—Sheet 1.

T. HALLIWELL.
APPARATUS FOR DYEING, &c.

No. 585,752. Patented July 6, 1897.

WITNESSES.
Joseph Bates
Harry Barnfather

INVENTOR.
Thomas Halliwell
by Wm. P. Thompson & Co.
atty.

(No Model.) 6 Sheets—Sheet 2.

T. HALLIWELL.
APPARATUS FOR DYEING, &c.

No. 585,752. Patented July 6, 1897.

WITNESSES.
Joseph Bates
Harry Barnfather

INVENTOR
Thomas Halliwell

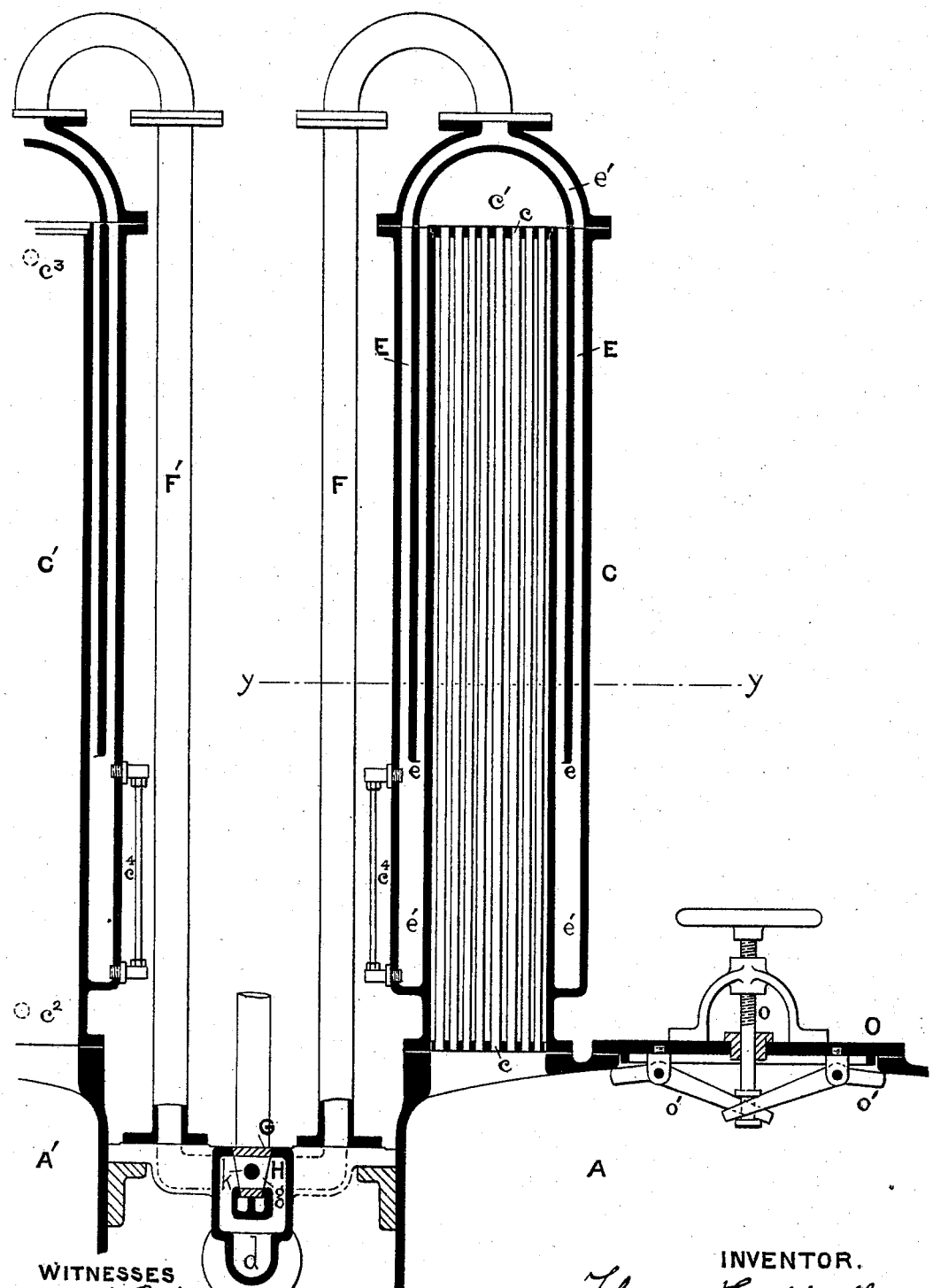

(No Model.) 6 Sheets—Sheet 4.

T. HALLIWELL.
APPARATUS FOR DYEING, &c.

No. 585,752. Patented July 6, 1897.

WITNESSES
Joseph Bates
Harry Barnfather

INVENTOR
Thomas Halliwell (No Model.) 6 Sheets—Sheet 5.

T. HALLIWELL.
APPARATUS FOR DYEING, &c.

No. 585,752. Patented July 6, 1897.

WITNESSES.
Joseph Bates
Harry Barnfather

INVENTOR
Thomas Halliwell
by Wm. P. Thompson & Co.
attys.

UNITED STATES PATENT OFFICE.

THOMAS HALLIWELL, OF ECCLES, ENGLAND.

APPARATUS FOR DYEING, &c.

SPECIFICATION forming part of Letters Patent No. 585,752, dated July 6, 1897.

Application filed November 27, 1896. Serial No. 613,610. (No model.)

*To all whom it may concern:*

Be it known that I, THOMAS HALLIWELL, a subject of the Queen of Great Britain, residing at Eccles, in the county of Lancaster, England, have invented certain new and useful Improvements in Apparatus for Dyeing, Bleaching, or Scouring Fibrous Materials, of which the following is a specification.

This invention relates to improved apparatus for dyeing, scouring, or bleaching yarn in the form or shape of cops or other fibrous material. It will be fully described with reference to the accompanying drawings.

Figure 1:
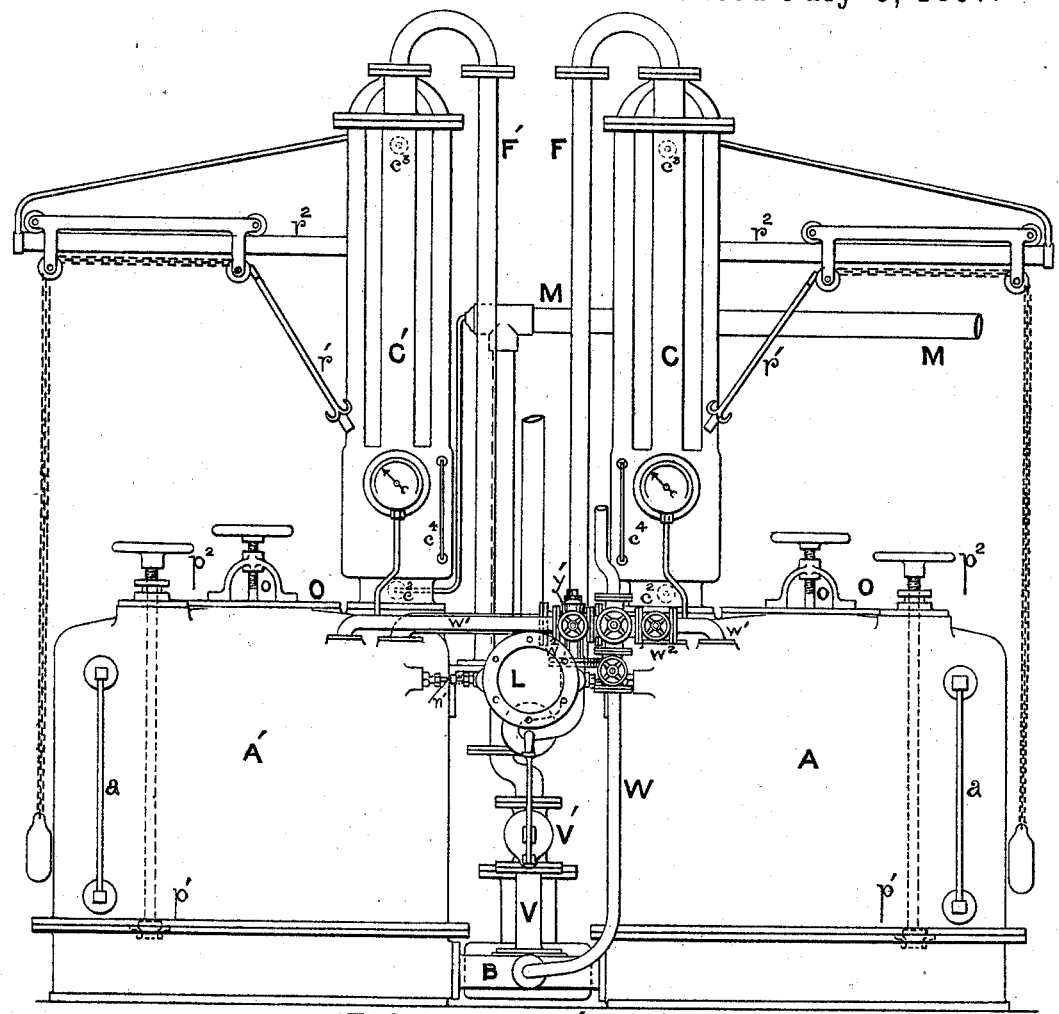
Figure 2:
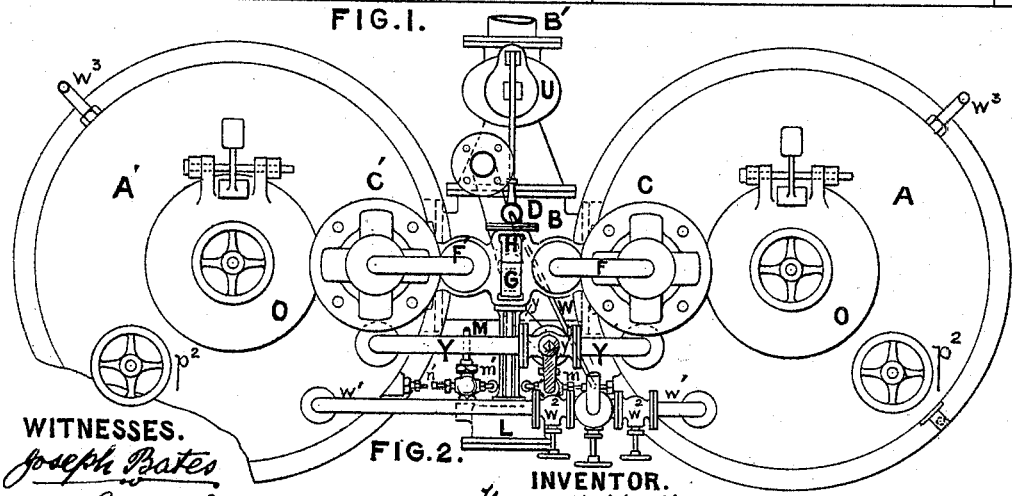
Figure 3:
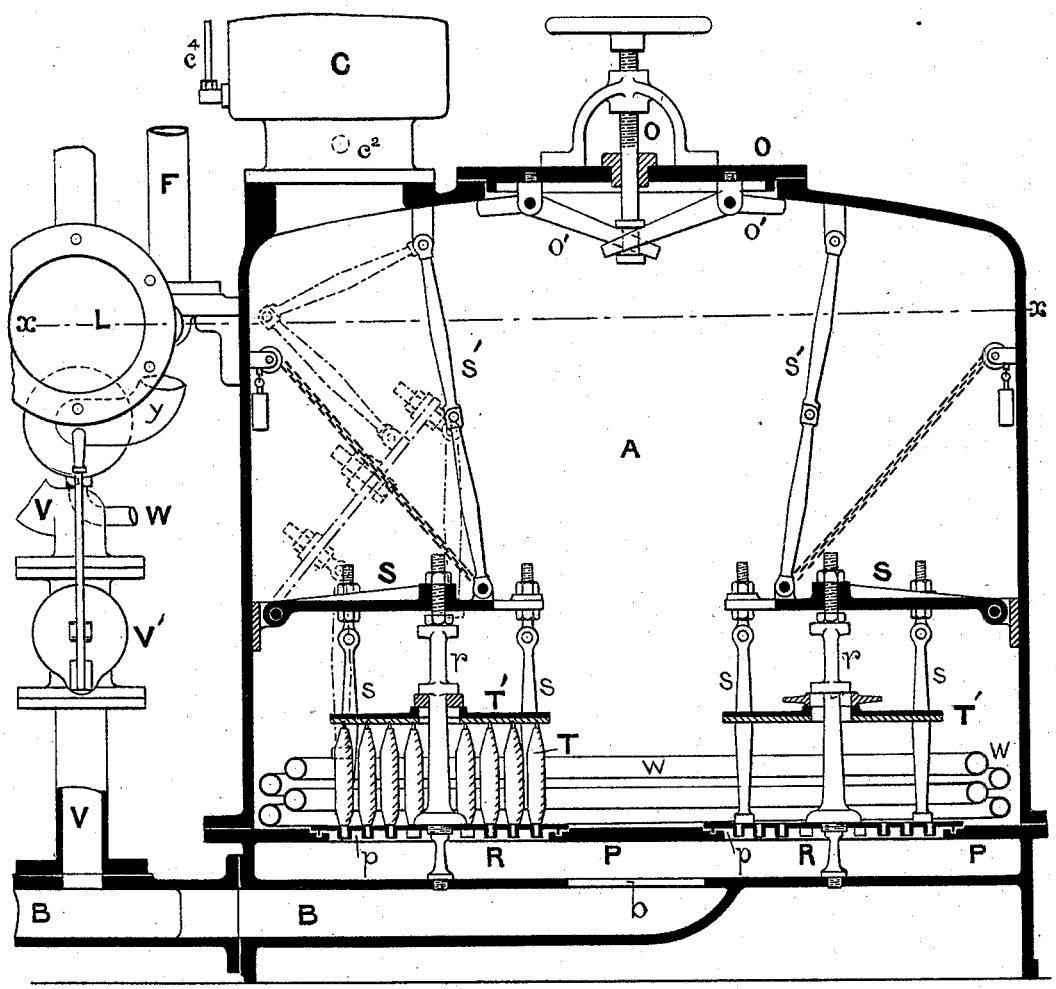
Figure 7:
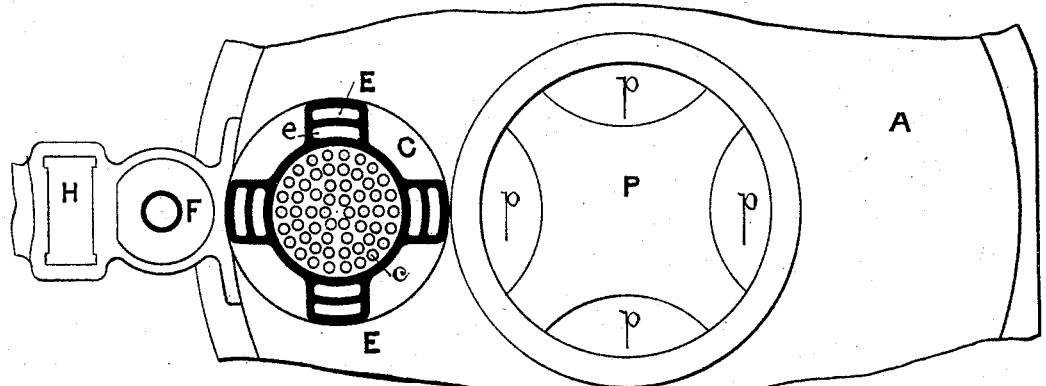
Figure 5:
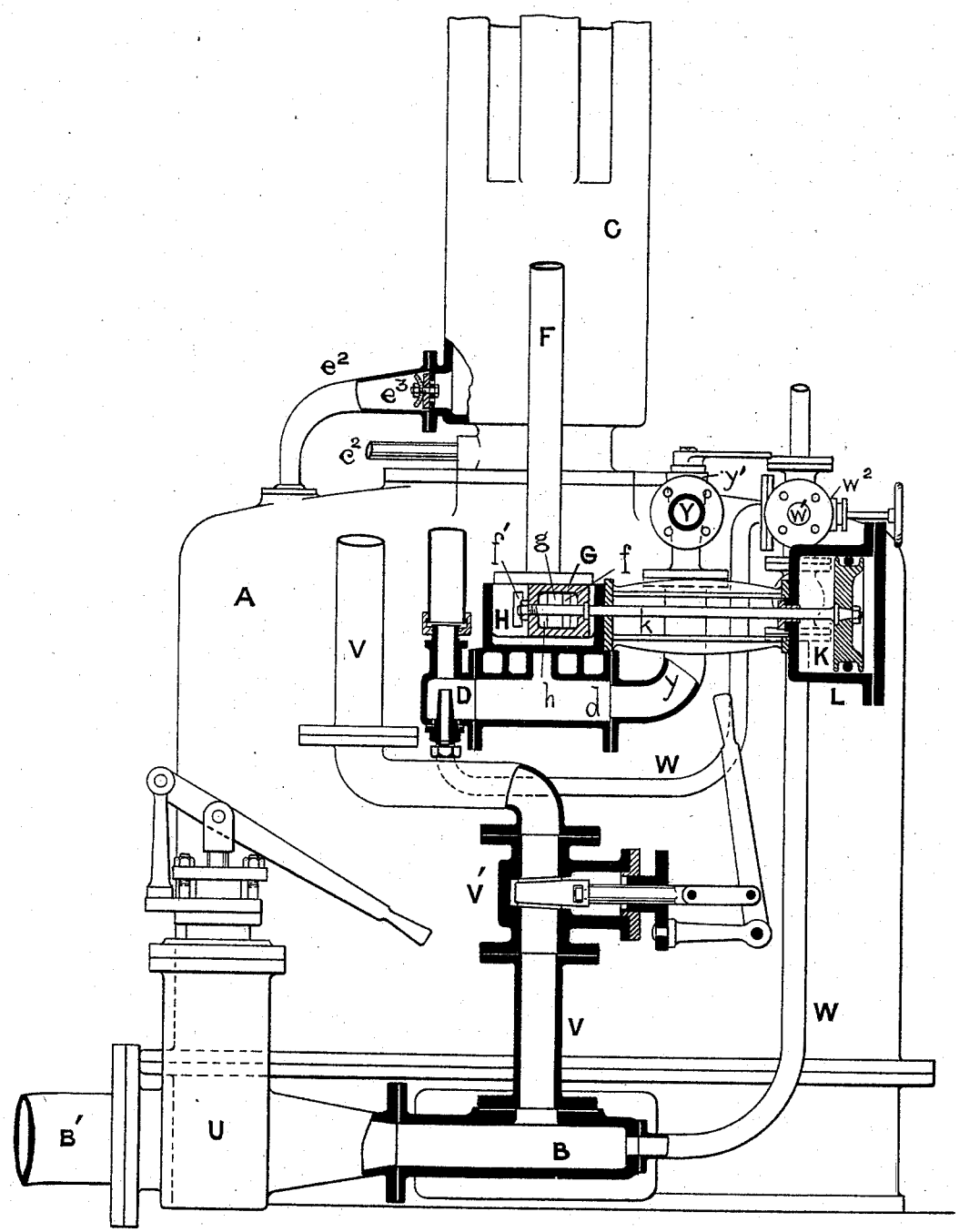
Figure 6:
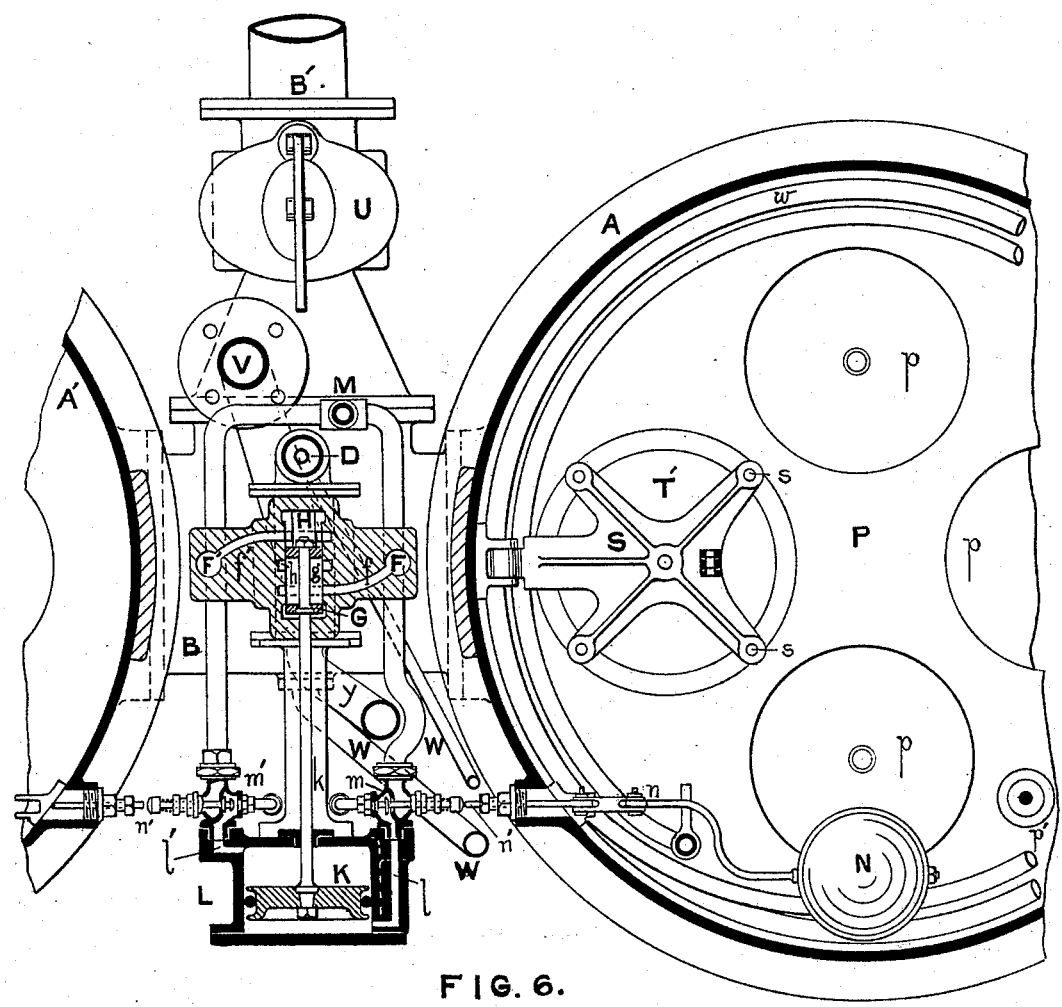
Figure 8:
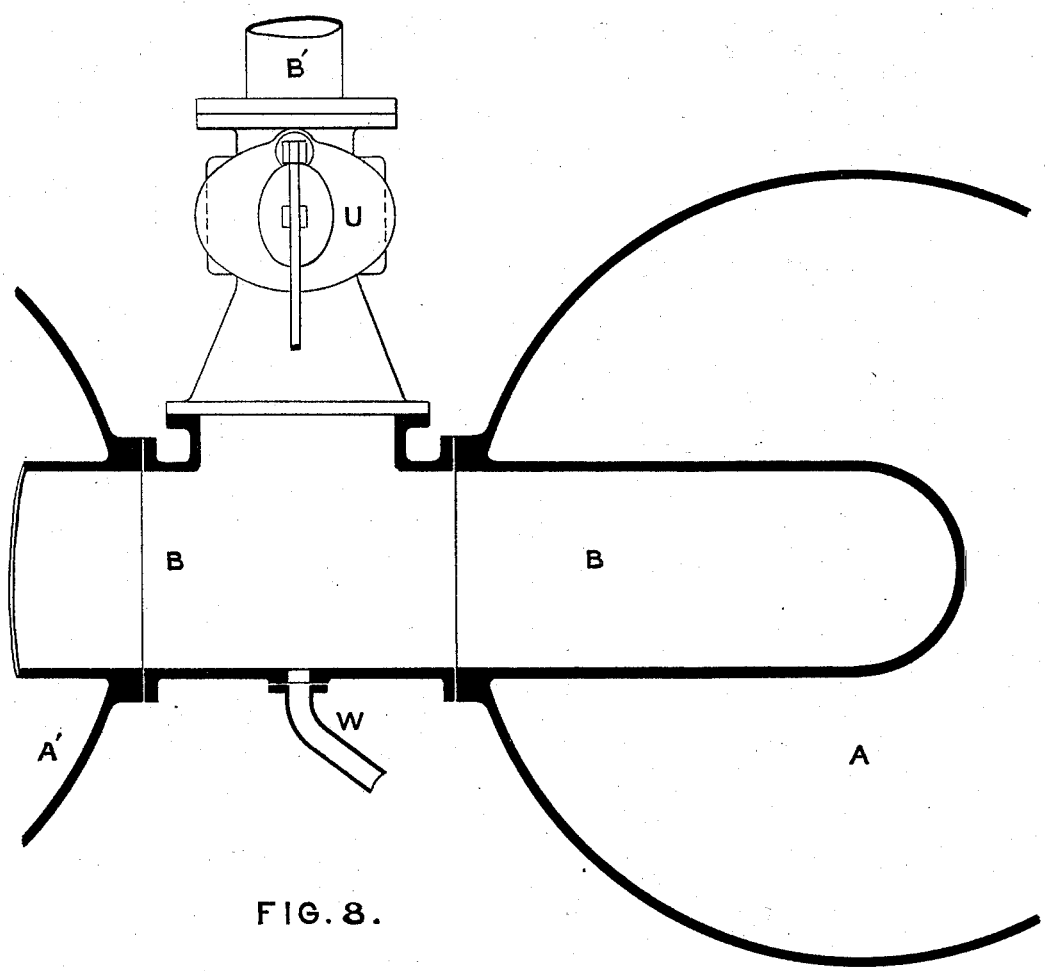

Figure 1 is a front elevation; Fig. 2, a plan; Fig. 3, a sectional elevation of part of apparatus through one of the chambers A, drawn to a larger scale; Fig. 4, a sectional elevation of part of apparatus through one of the auxiliary chambers C, drawn to a larger scale; Fig. 5, a transverse section; Fig. 6, a sectional plan of part of apparatus on line $x\, x$, Fig. 3; Fig. 7, a plan, partly in section, on line $y\, y$, Fig. 4; Fig. 8, a sectional plan of bottom of vat A.

I construct my improved apparatus with two closed chambers or vats A A' to receive the yarn-cops or material to be dyed and to contain the liquor with which yarn-cops or other material is to be treated. The chambers or vats A A' are preferably cylindrical in shape and are connected at the bottom by a pipe or pipes B, through which the dye or other liquor can flow from the vat or chamber A to the other vat or chamber A'.

On the top of each of the vats or dye-chambers A A', I place a second or auxiliary chamber C C', extending to a considerable height above the dye-chambers. By means of these auxiliary chambers the dye-vats A A' are connected to an ejector D or to an air-pump or other exhauster, by which a vacuum or partial vacuum may be produced in either of the dye-chambers A A' to fill them with dye liquor or to cause the dye liquor to flow from one to the other through the bottom pipe B.

The upper chambers C C' act as condensers to condense and collect any steam or moisture drawn off from the dye-chambers A A'. They are each provided with a central passage or chamber fitted with a number of tubes $c$, extending throughout its length, through which the air and vapor are drawn off by the ejector or exhauster D, and with a number of side passages E, preferably four, each divided longitudinally into two parts by a division-plate $e$. Cold water is caused to circulate around the pipes $c$, entering at the inlet-pipe $c^2$ near the bottom and flowing out by an outlet-pipe $c^3$ near the top, for the purpose of condensing any vapor or steam that may be drawn up into them by the exhauster or ejector D.

The side passages E at the top at one side of the division-plate $e$ open into the chamber $c'$, which is also in communication with the pipes $c$, and at the other side of the division-plate are joined or connected with one another with a chamber $e'$, in which any moisture carried up through the pipes $c$ collects and from which it can be drawn off. At the bottom of the chamber $e'$ below the side passages E is fitted a discharge-pipe $e^2$, fitted with a suitable valve $e^3$, Fig. 5, through which any water of condensation or liquor therein can be drawn off and returned to the vat A. This valve works automatically when the pressure in the vat A is below that in the chamber $e'$. The chamber $e'$ is also fitted with a gage-glass $c^4$ to indicate the amount of liquor collected therein.

The side passages E and the condensing-chambers C C' are connected with the exhaust or ejector D by means of the pipes F F' and the valve G, working in the valve-chamber H.

The valve G is constructed with a central port $g$, so as to be capable of placing each of the vats A A', through the chambers C C', side passages E, and pipes F F', alternately in connection with the exhaust or ejector D and with the external atmosphere. The valve-chamber H is provided with three ports. Two of these ports, $f\, f'$, connect and communicate with the exhaust-pipes F F', one at each side, and the third one, $h$, connects with the exhaust or ejector D by the pipe $d$. When the valve G is at one end of the chamber H, (see Figs. 4 and 5,) the port $f$ is brought into communication with the port $h$ and with the exhaust or ejector D, and the port $f'$ is uncovered and is open to the atmosphere, so that air can pass through it into the pipe F', and when moved to the other edge of the chamber H the port $f'$ is brought into communication with the port $h$ and the exhaust or ejector D, and the port $f$ and pipe F are opened to the atmosphere. When the valve G is placed in the center of the valve-chamber H, both ports $f\, f'$ are closed.

The valve G is worked to and fro by hydraulic pressure by means of a piston K, working in a cylinder L, to which water is admitted through the ports $l\ l'$. The piston K is connected to the valve G by the piston-rod $k$. The water to operate the piston K is supplied from a main water-pipe M through the water-supply valves $m\ m'$.

The valves $m\ m'$, which supply the water to the cylinder L, are operated or opened alternately by floats N in the interior of the vats A A'. Each float N is connected by means of a connecting link or lever $n$ with a spindle $n'$, which projects through the side of the vat and which is forced outward when the float N rises, coming into contact with the spindle of the water-supply valve $m$ and opening the valve. The valve $m$ is held closed by a spring. The valves $m\ m'$ have each double ports, and when the inlet-waterway is closed the exhaust is open, through which the exhaust-water from the back of the piston flows away.

Each of the vats A A' is fitted on top with a hinged lid or cover O, which is held down in position when closed by a screw $o$, engaging with and operating two pivoted levers $o'$. When the screw is lowered, the ends of the levers $o'$ are forced out under the edges of the top, and when the screw is raised the ends of the levers are withdrawn.

In the interior of each of dye vats or chambers A A' is fitted a false bottom or plate P, above the inlet $b$ of the pipe B, through which the liquor is admitted. The bottom or plate P is provided with a number of (preferably four) openings $p$, over or upon each of which is placed a plate or carrier R, upon which on hollow skewers the cops of yarn T are placed. The plate P is also provided with a valve $p'$, which can be opened and closed from the outside of the vat by the handle $p^2$, through which liquor may be allowed to pass either up or down when required.

The cop carriers or plates R are each formed with an upright handle $r$, by which they can be lifted into and out of the vat. They are held in position in the interior of the vat by a lever S, pivoted to side which rests on the top of the handle $r$, and depending arms $s$ therefrom rest on the edges of the plate or carrier R. The pivoted lever S is secured by the double or jointed links $s'$, pivoted to the top. The cop-carriers R are lifted into and out of the vats by means of a hook $r'$, attached to a chain passing over a pulley and counterweighted at the other end, the pulleys being supported on a swiveling arm $r^2$, as shown in Fig. 1.

On the handle $r$ of the cop-carrier R is placed a plate T', which rests upon the top of the hollow skewers or spindles in the interior of the cops T and holds the cops in position.

The pipe B, which connects the two dye chambers or vats at the bottom, also serves as a means of communication for introducing the dye liquor or for supplying water or steam to the dye-vats A A'. At the back of the pipe B, I attach an inlet-pipe B', through which the dye or other liquid is drawn from a cistern or other vessel into the vats. This pipe B' is fitted with a stop-valve U, which is maintained closed while the apparatus is at work and is opened to supply the dye liquor to or discharge it from the vats A A'. On the top of the bottom pipe B, I attach a water-pipe V, with a valve V', through which water can be introduced into the vats A A' to wash the cops, and in front I attach a steam-pipe W for introducing steam into the vats at the bottom to steam the cops. Another branch of the steam-pipe W conveys steam to the ejector or exhauster D.

A steam-coil $w$ is placed in the interior of the vats to heat them to the desired temperature. These coils are connected by the steam-pipes $w'$ and the valves $w^2$, and the waste steam escapes at the discharge-pipe $w^3$. The two vats A A' are also connected at top by means of a pipe Y with a branch $y$ extending to the valve-chamber, in communication with the ejector or exhauster D and fitted with a three-way valve $y'$. By means of this pipe and valve both vats can be exhausted at the same time for the purpose of filling them with liquor or for drawing air or steam through the cops.

In operating the apparatus the cops of yarn T on the top carriers R are placed in position in the interior of the vats A A' over the apertures $p$ in the bottom P and secured by the levers S and links $s'$, and the lid is closed. The stop-valve U on the pipe B' is then opened to admit the dye liquor, and the ejector or exhauster D is set in operation, the valve G being set in a central position to close ports $f f'$, which lead to the vats. The three-way valve $y'$ in the pipe Y is next opened, placing the ejector or exhauster D in communication with the vats A A' and the exhaust or vacuum therein slowly draws up the dye liquor into them until there is sufficient. The stop-valve U and the three-way valve $y'$ are now closed and the valve G moved to one end of the valve-chamber H, putting the port $f$ in communication with the exhauster or ejector D, thereby creating a vacuum in the vat A and drawing the liquor from the vat A until it reaches the height of the float N and raises it. The rising of the liquor and the raising of the float N (see Fig. 6) in the vat A forces or moves out the spindle $n'$, which projects through the side until it comes into contact with the spindle of the water-supply valve $m$ and admits water to the other side of the piston K in the hydraulic cylinder L and reverses its position and causing the valve G to move from one end of the chamber H to the other and changing the exhaust from the vat A to the vat A'. By this arrangement the working of the vats is rendered automatic. As soon as the position of the valve G is changed the exhaust is applied to the other vat and the liquor then flows back through the pipe B until the operation is again reversed in a similar manner. This movement of the liquor from one vat to the other forces the liquor through the cops T first in one direction and then in the reverse. The air and vapor drawn off from the top of the vat A passes through the pipes c, around which cold water is circulating, in which any steam or vapor is condensed, thereby assisting the formation of the vacuum, and thence up the side passages E of the auxiliary chamber C to the pipe F, any condensed water which may be carried over from the pipes c collecting in the chamber c' at the bottom. The liquor is discharged from the vats again by opening the stop-valve U. Steam is admitted into the vats when required by the steam-pipe W and water from the water-main V through the valve V'.

What I claim as my invention, and desire to protect by Letters Patent, is—

1. Apparatus for dyeing bleaching or scouring cops or other textile materials constructed with two vats or dye-chambers connected with a bottom communicating pipe, two condensing-chambers placed above the vats connected with an ejector or exhauster, a slide-valve for alternately placing the vats in communication with the exhauster and the atmosphere, a hydraulic cylinder and piston for automatically operating the slide-valve, floats placed inside the vats for opening the water-supply to the hydraulic cylinder when the vat is filled with liquor to reverse the valves, and dye, steam, and water admission valves arranged substantially as and for the purpose described.

2. Apparatus for dyeing scouring and bleaching textile materials comprising the two vats A A' each provided with a false bottom P and inlet B by which they are connected together through which the liquor enters two auxiliary condensing-chambers through which the vats are exhausted, a slide-valve alternately placing each of the vats in communication with an exhauster, an ejector for exhausting the vats a hydraulic piston and cylinder connected to the slide-valve for actuating it a water-inlet valve placed at the side of the hydraulic cylinder and a float placed inside each vat which rises with the liquor therein and opens the water-inlet valve when the vat is full to reverse the position of the slide-valve substantially as described.

3. In apparatus for dyeing scouring and bleaching textile materials the combination with two vats A A' connected together so that the liquor can flow from one to the other and an ejector for exhausting them of condensing-chambers C C' comprising a central chamber fitted with a number of tubes extending throughout their length around which cold water circulates a number of side passages E divided longitudinally into two parts by division-plates e and a chamber at the bottom in which condensed moisture is collected substantially as described.

4. In apparatus for dyeing scouring and bleaching textile materials the combination with a vat A provided with false bottom P and inlet-pipe B of a cop-carrier plate R provided with a handle r placed over apertures p in the false bottom the skewers projecting from the carrier-plate R for the cops T the lever S pivoted to the side resting upon the handle r to hold the cop-carrier in position and the jointed links s' for holding the lever S tightly down substantially as described.

5. In apparatus for dyeing bleaching and scouring textile materials the combination with two vats A A' connected together at the bottom by inlet-pipes B condensing-chambers C C' placed on top and exhaust-pipes F of a valve-chamber H provided with three ports with which the exhaust-pipes are connected, the slide-valve G placed therein which alternately opens and closes the ports leading to the exhaust-pipes F and hydraulic piston K connected to the slide-valve G by the piston-rod k a hydraulic cylinder provided with ports l l' in which the piston K works the exhauster D connected to the valve-chamber H and the water-inlet valve V' and discharge-valve U connected with the inlet-pipe B substantially as described.

6. In apparatus for dyeing bleaching and scouring textile materials the combination with a slide-valve H hydraulic piston K and cylinder L for actuating same and an ejector D for exhausting the vats of the steam-pipe W connected to the ejector to convey steam thereto the pipes Y and y connecting the ejector direct with the vats the three-way valve y' affixed therein the water-pipe M connected to the cylinder L and the valves m m' thereon for controlling the flow of water to the cylinder L substantially as described.

7. In apparatus for dyeing bleaching or scouring textile materials the combination of two dye-vats A A' connected at the bottom by a communicating pipe B two condensing-chambers C C' placed above the vats A A' connected with the ejector or exhauster D a slide-valve G for alternately placing the vats in communication with the exhauster and the atmosphere and hydraulic cylinder K and piston L for automatically operating the valve G floats N placed inside the vats for opening the water-supply valves m m' when the vat is filled with liquor to reverse the valve G and dye-inlet pipe B' with valve U a water-inlet pipe V with valve V' and a steam-pipe W carriers R placed inside to hold cops of yarn and pivoted levers S depending arms s and links s' to hold the carriers in position substantially as described.

In testimony whereof I have signed my name to this specification in the presence of two subscribing witnesses.

THOMAS HALLIWELL.

Witnesses:
J. OWDEN O'BRIEN,
HARRY BARNFATHER.